(12) United States Patent
Washizu et al.

(10) Patent No.: US 10,259,118 B2
(45) Date of Patent: Apr. 16, 2019

(54) ROBOT SYSTEM HAVING FUNCTION OF SIMPLIFYING TEACHING OPERATION AND IMPROVING OPERATING PERFORMANCE BY LEARNING

(71) Applicant: FANUC CORPORATION, Yamanashi (JP)

(72) Inventors: Shinichi Washizu, Yamanashi (JP); Hajime Suzuki, Yamanashi (JP); Kaimeng Wang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 172 days.

(21) Appl. No.: 15/360,851

(22) Filed: Nov. 23, 2016

(65) Prior Publication Data
US 2017/0144301 A1 May 25, 2017

(30) Foreign Application Priority Data
Nov. 24, 2015 (JP) .................................. 2015-228649

(51) Int. Cl.
*B25J 9/16* (2006.01)

(52) U.S. Cl.
CPC ........... *B25J 9/1679* (2013.01); *B25J 9/1651* (2013.01); *G05B 2219/37555* (2013.01); *G05B 2219/40007* (2013.01); *G05B 2219/40014* (2013.01); *G05B 2219/43203* (2013.01); *Y10S 901/02* (2013.01)

(58) Field of Classification Search
CPC ........ B25J 9/163; B25J 9/1638; B25J 9/1651; B25J 9/1679; Y10S 901/02; G05B 2219/40014; G05B 2219/37555; G05B 2219/40007; G05B 2219/43203
See application file for complete search history.

(56) References Cited

U.S. PATENT DOCUMENTS

| | | |
|---|---|---|
| 8,972,057 B1 | 3/2015 | Freeman et al. |
| 2014/0012419 A1 | 1/2014 | Nakajima |
| 2015/0251312 A1 | 9/2015 | Suzuki et al. |

FOREIGN PATENT DOCUMENTS

| | | |
|---|---|---|
| CN | 103770112 A | 5/2014 |
| CN | 104254430 A | 12/2014 |
| CN | 104684695 A | 6/2015 |
| CN | 104889986 A | 9/2015 |
| JP | 7-319558 A | 12/1995 |
| JP | 2011-167817 A | 9/2011 |
| JP | 2013-182348 A | 9/2013 |

(Continued)

*Primary Examiner* — Spencer D Patton
(74) *Attorney, Agent, or Firm* — Hauptman Ham, LLP (57) ABSTRACT

A robot system includes a detector for detecting the position and posture of a workpiece; a robot for performing a predetermined operation on the workpiece; and a robot control device. The robot control device includes an area divider for dividing an operation area into a plurality of areas; an area determiner for determining in which area the workpiece is present; a learning controller for learning an operation speedup ratio to speed up an operation by varying speed or acceleration on an area-by-area basis in which the workpiece is present; a memory for storing the position of the workpiece and the operation speedup ratio; and a controller that performs the operation on a new workpiece using the learned operation speedup ratio when the operation has been learned in the area having the new workpiece, and makes the learning controller learn the operation speedup ratio when the operation has not been learned.

5 Claims, 8 Drawing Sheets

(56) References Cited

FOREIGN PATENT DOCUMENTS

| | | |
|---|---|---|
| JP | 2014-14876 A | 1/2014 |
| JP | 2014-170469 A | 9/2014 |
| JP | 2015-168053 A | 9/2015 |

ROBOT SYSTEM HAVING FUNCTION OF SIMPLIFYING TEACHING OPERATION AND IMPROVING OPERATING PERFORMANCE BY LEARNING

This application is a new U.S. patent application that claims benefit of JP 2015-228649 filed on Nov. 24, 2015, the content of 2015-228649 is incorporated herein by reference.

BACKGROUND OF THE INVENTION

1. Field of the Invention

The present invention relates to a robot system constituted of a robot and peripheral devices, and more specifically relates to a robot system that increases the operating speed of a robot and improves the operation efficiency of the system by learning.

2. Description of Related Art

In production sites, production lines including a system, which is constituted of a robot and peripheral devices, have target cycle times. To achieve the target cycle times, teaching operators perform a teaching operation by trial and error using experience and know-how of the operators, such as devising the configuration of teaching programs to operate the robot or teaching convenient postures.

In this case, an operating speed is increased depending on techniques of the operators, thus deteriorating operating efficiency and requiring significant time. To solve this problem, a method for increasing the operating speed without depending on the techniques of the operators, by repetition of learning the same operation is proposed (for example, Japanese Unexamined Patent Publication (Kokai) No. 2011-167817, hereinafter referred to as "patent document 1").

The invention described in patent document 1 requires an additional sensor to the robot for precise vibration suppression. Also, in the case of the operation in which the position and posture of a workpiece change in accordance with a state of the workpiece, the operation is difficult to learn in arbitrary positions.

In response to this problem, a method in which a virtual workpiece is disposed in arbitrary positions and operated to learn the operation in the arbitrary positions is known. However, since the workpiece is not actually present, this method cannot correctly learn a load applied to the robot and the like. Also, the operation may be learned even in unused positions, unless the virtual workpiece is disposed in consideration of a disposition state of the workpiece on an actual production line.

SUMMARY OF THE INVENTION

The present invention aims at providing a robot system that can easily speed up the operation of a robot by learning, even in the case of the operation in which a position and a posture vary in a predetermined operation area, without requiring know-how of teaching nor using a specific device such as a sensor for vibration suppression.

To achieve the above object, the present invention provides a robot system that includes a detector for detecting the position and posture of a workpiece to be operated present in a predetermined operation area; a robot for performing a predetermined operation on the workpiece based on information about the detected position and posture; and a robot control device for controlling the robot. The robot control device includes an area divider for dividing the operation area into a plurality of areas by a predetermined resolution; an area determiner for determining in which of the plurality of areas the workpiece is present; a learning controller for learning an operation speedup ratio to speed up the operation by varying speed or acceleration on an area-by-area basis in which the workpiece is present; a memory for storing the position of the area in which the workpiece is present and the operation speedup ratio of the area; and a controller for determining whether or not the operation has already been learned in the area in which a new workpiece is present. When the operation has already been learned, the controller controls the robot to perform the operation on the new workpiece using the learned operation speedup ratio. When the operation has not been learned, the controller makes the learning controller learn the operation speedup ratio.

In a preferred embodiment, the operation performed by the robot includes a grasping operation by which the robot grasps the workpiece disposed in the operation area and a putting operation in which the robot puts the grasped workpiece in a workpiece completion area.

In another preferred embodiment, the learning controller changes a priority of operation of each of the plurality of areas in accordance with a state of learning.

In yet another preferred embodiment, the learning controller calculates the operation speedup ratio based on an allowable load of a motor for driving each axis of the robot and a load of the motor during execution of an operation pattern, and the memory stores the operation speedup ratio together with operation information including at least one of the speed and the acceleration before learning the operation.

In yet another preferred embodiment, the learning controller calculates the operation speedup ratio based on difference information between a command value to a motor for driving each axis of the robot and a feedback value from the motor during execution of an operation pattern, and the memory stores the operation speedup ratio together with operation information including at least one of the speed and the acceleration before learning the operation.

In yet another preferred embodiment, the learning controller retrieves a learned operation that is similar to an operation to be operated before execution of the operation. When the learned operation is present, an operation speedup ratio is corrected based on an operation speedup ratio associated with the learned operation and a difference between information on the operation before execution and information on the learned operation. The controller speeds up the operation using the corrected operation speedup ratio.

BRIEF DESCRIPTION OF THE DRAWINGS

The objects, features, and advantages of the present invention will be more apparent from the following description of embodiments in conjunction with the attached drawings, wherein.

DETAILED DESCRIPTION OF THE INVENTION

A robot system according to the present invention will be described below with reference to the drawings.

[First Embodiment]

Figure 1:
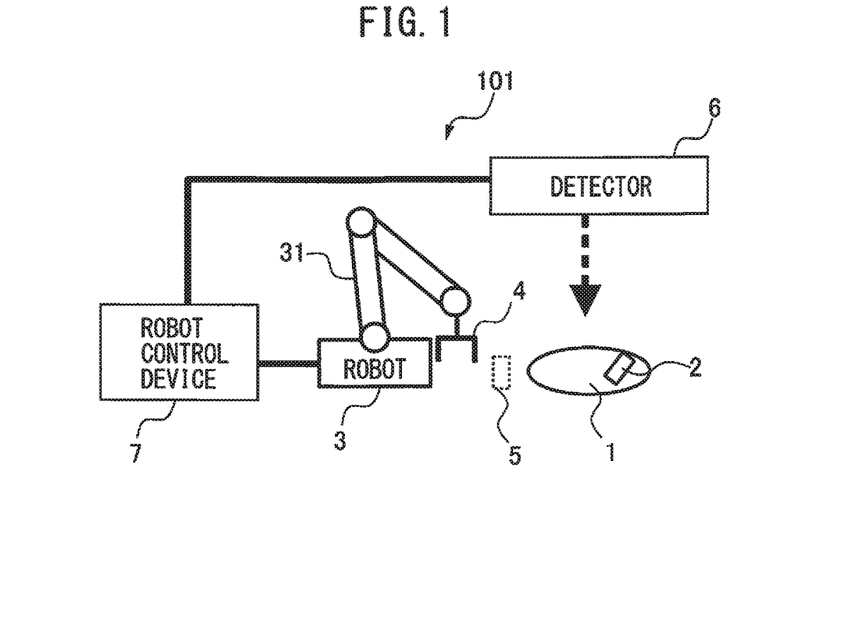
FIG. 1 is a schematic diagram showing the entire configuration of a robot system according to a first embodiment of the present invention.

A robot system according to a first embodiment of the present invention will be described. FIG. 1 is a schematic diagram showing the entire configuration of the robot system according to the first embodiment of the present invention. A robot system 101 according to the first embodiment of the present invention includes a detector 6, a robot 3, and a robot control device 7. The robot 3 is, for example, a six-axis articulated robot having robot arms 31 and a hand 4 attached to a distal end of the robot arm 31.

The detector 6 detects the position and posture of a workpiece 2 to be operated that is present in a predetermined operation area 1. The robot control device 7 calculates a correction amount to correct the operations of the robot 3 (the position and posture of the robot at every minute time interval) based on a detection result by the detector 6. As an example of the detector 6, there is a visual sensor using a camera that can image a part or the whole of the operation area 1.

The robot 3 performs the predetermined operations on the workpiece 2 based on the detected position and posture information. As an example, the operations of the robot 3 include a grasping operation by which the robot 3 grasps the workpiece 2 disposed in the operation area 1, and a putting operation by which the robot 3 puts the grasped workpiece 2 in an operation completion area 5. More specifically, the robot 3 grasps the workpiece 2 that is put in the operation area 1 in an indeterminate position and posture with the hand 4 attached to the robot 3, and puts the workpiece 2 in the predetermined area 5.

The robot control device 7 controls the robot 3. The robot control device 7 can learn an operation speedup ratio to speed up the operation by varying speed or acceleration relative to the performed operation.

Figure 2:
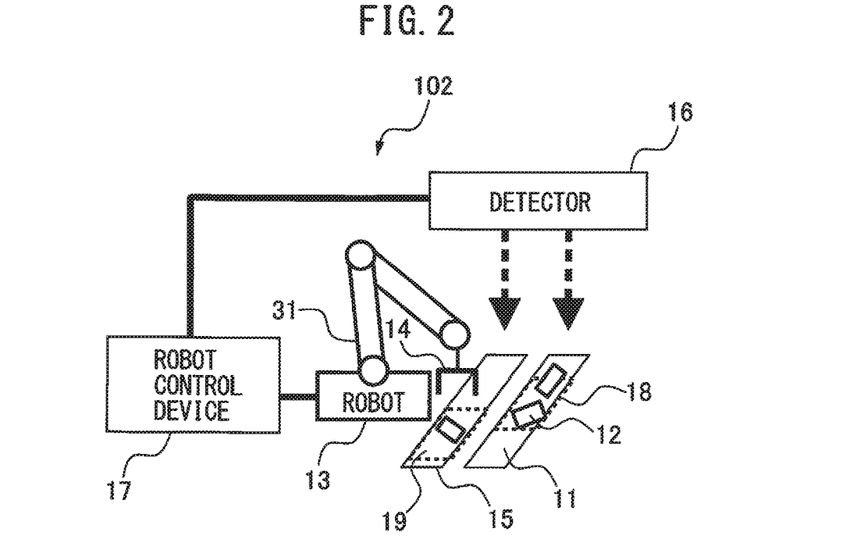
FIG. 2 is a schematic diagram showing the entire configuration of another robot system according to the first embodiment of the present invention.

FIG. 2 is a schematic diagram showing the entire configuration of another robot system according to the first embodiment of the present invention. In the robot system shown in FIG. 2, the operations of a robot 13 include a grasping operation by which the robot 13 grasps a workpiece 12 disposed in an operation area, and a putting operation by which the robot 13 puts the grasped workpiece 12 in an operation completion area 19. More specifically, the robot 13 grasps the workpiece 12 that is flowing on a feed conveyor 11 with a hand 14 attached to the robot 13 in a feed conveyor operation area 18, and puts the workpiece 12 in an ejection conveyor operation area 19 on an ejection conveyor 15. A detector 16 is provided in the feed conveyor 11 and the ejection conveyor 15 to detect the position and posture of the workpiece 12 at the time of being grasped and put, as needed, and correct the operations of the robot 13. Only one detector is provided in the example of FIG. 2, but a detector may be provided in each of the feed conveyor 11 and the ejection conveyor 15. As examples of the detector, there are a visual sensor and an encoder. In this robot system, an operation speedup ratio can be learned to speed up the operation by varying speed or acceleration relative to the performed operation.

Figure 3:
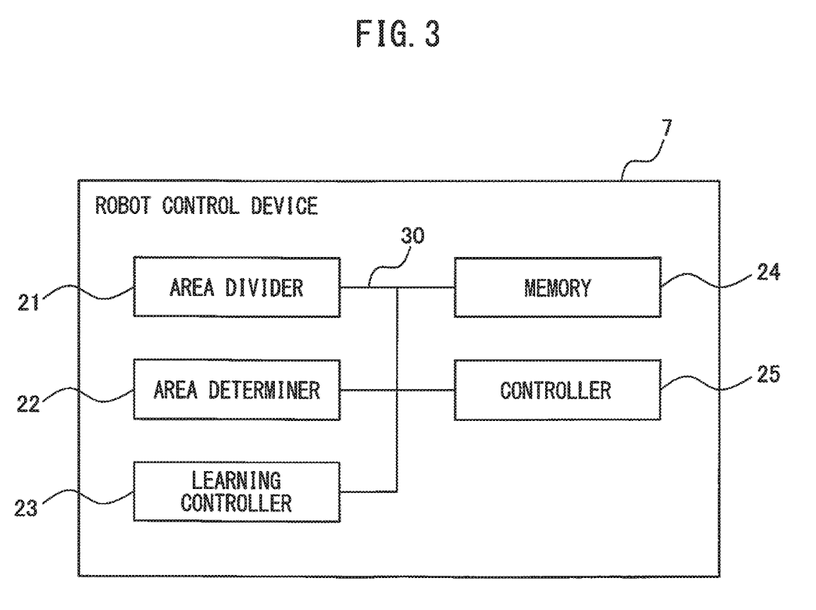
FIG. 3 is a block diagram of a robot control device included in the robot system according to the first embodiment of the present invention.

FIG. 3 is a block diagram of the robot control device 7 included in the robot system 101 according to the first embodiment of the present invention. The robot control device 7 includes an area divider 21, an area determiner 22, a learning controller 23, a memory 24, and a controller 25 that are connected to a bus 30. Note that, a robot control device 17 has the same configuration as the robot control device 7.

The area divider 21 divides the operation area 1 into a plurality of areas by a predetermined resolution. An example of dividing the operation area 1 will be described later.

The area determiner 22 determines in which of the divided plurality of areas the workpiece 2 is present.

The learning controller 23 learns the operation speedup ratio on an area-by-area basis in which the workpiece 2 is present, to speed up the operation by varying speed or acceleration.

The memory 24 stores the position of the area where the workpiece 2 is present and the operation speedup ratio of each area.

The controller 25 determines whether or not the operation has already been learned in the area where a new workpiece is present. When the operation has already been learned, the controller 25 controls the robot 3 to perform the operation on the new workpiece using the learned operation speedup ratio. When the operation has not been learned, the controller 25 makes the learning controller 23 learn the operation speedup ratio.

In FIGS. 1 and 2, the robot control devices 7 and 17 control motors (preferably servomotors) each for driving an axis of the robots 3 and 13, to move the hands 4 and 14 of the robot systems 101 and 102, respectively. Operation information including at least one of the speed, acceleration, torque, and error of each motor during operation, which is temporarily required in learning, is stored in a volatile memory (not shown) of the memory 24. Predetermined allowance values of the speed, acceleration, torque, error, and the like of each motor are stored in ROM (not shown) of the memory 24. Learning data such as the operation speedup ratio (described later) calculated in a learning process is stored in a nonvolatile memory of the memory 24.

Figure 4:
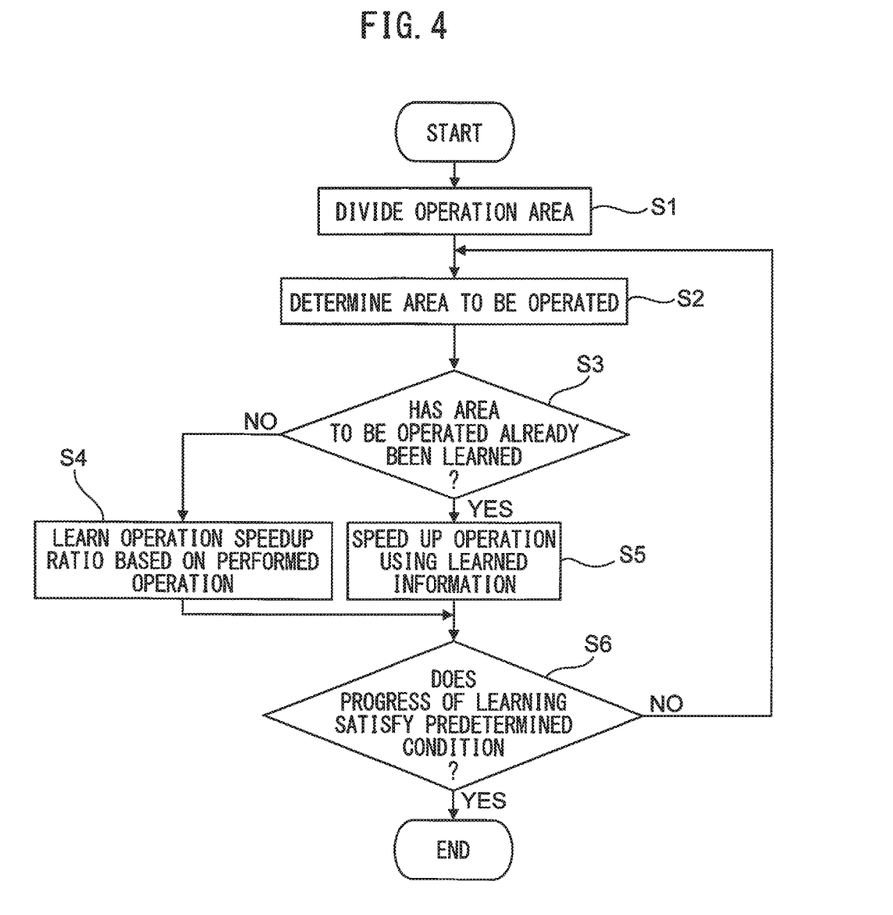
FIG. 4 is a flowchart showing the operation flow of the robot system according to the first embodiment of the present invention.

FIG. 4 is a flowchart showing the operation flow of this embodiment in the robot system of FIG. 1 or 2. When learning is started, in step S1, the operation area (the operation area 1 in FIG. 1 and the operation areas 18 and 19 in FIG. 2) is divided into a plurality of areas by a predetermined resolution.

In step S2, before starting an actual operation, it is determined to which of the plurality of areas divided in step S1 an area to be operated corresponds. Then, in step S3, it is determined whether or not the area to be operated has already been learned, that is, whether an operation to be performed in this area has not been learned or has already been learned. When the operation is determined to have not been learned, in step S4, the operation speedup ratio is learned based on the performed operation. On the other hand, when the operation is determined to have already been learned, in step S5, the operation is speeded up based on the learned operation speedup ratio.

In step S6, the progress of the learning is determined based on a ratio between not-learned operations and learned operations or the like. When a predetermined condition is satisfied, the learning is completed. When the predetermined condition is not satisfied, the operation flow goes back to step S2 and the learning is continued.

Figure 5:
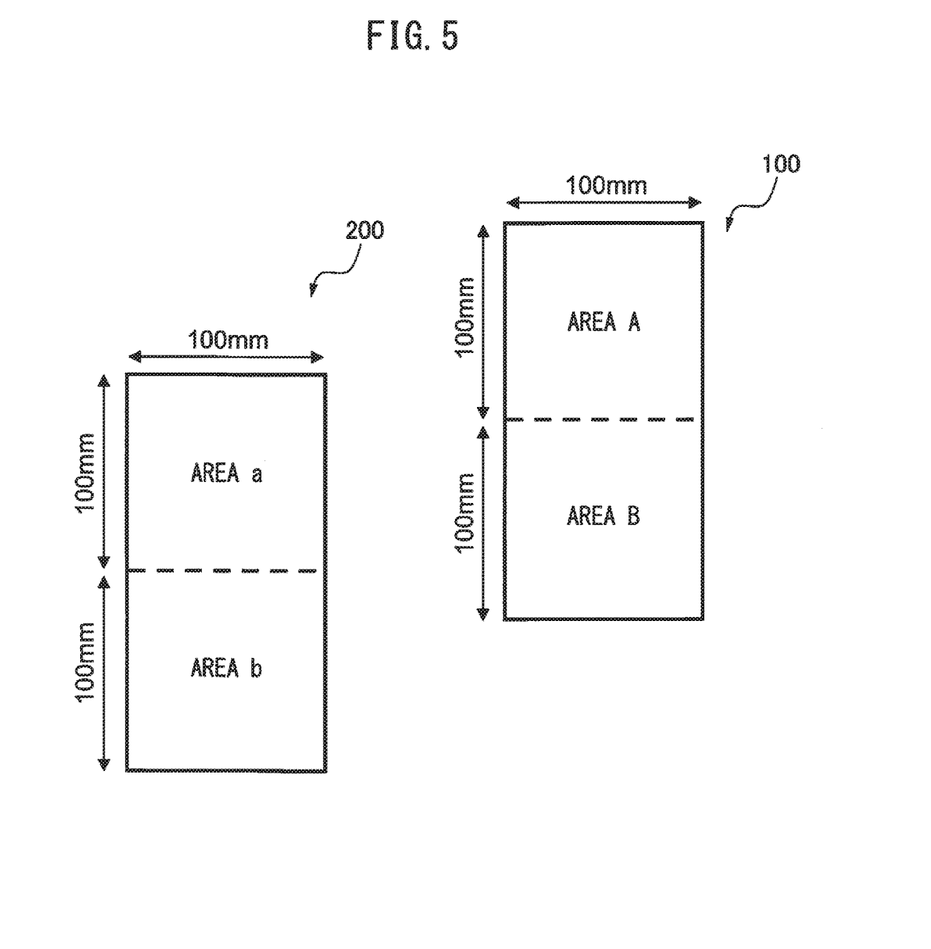
FIG. 5 is a drawing of an image of divided operation areas in the robot system according to the first embodiment of the present invention.

FIG. 5 is a drawing of an example of dividing an operation area 100 for the grasping operation and an operation area 200 for the putting operation, in which the area dividing resolution is 100 mm and the size of each of the operation areas 100 and 200 is 200 mm×100 mm in the system configuration as shown in FIG. 2. For example, the operation area 100 is divided into an "area A" and an "area B", while the operation area 200 is divided into an "area a" and an "area b".

In this case, the learning is performed on the condition that there are four grasping operations and four putting operations, that is, eight operations in total between the "area A and area a", between the "area A and area b", between the "area B and area a", and between the "area B and area b". For example, one of the putting operations refers to an operation after a workpiece is grasped in the "area A" until the workpiece is put in the "area a". On the contrary, one of the grasping operations refers to an operation after the workpiece is put in the "area a" until another workpiece is grasped from the "area A".

By performing the operations between the areas, allowable operation speedup ratios are learned. For example, the operation speedup ratios for the operation of grasping a workpiece in the "area A" and the operation of putting the workpiece in the "area b" are learned, and the area of grasping the workpiece, the area of putting the workpiece, and the operation speedup ratios are stored. As a result, when a new workpiece present in the "area A" is moved to the "area b", the operations can be speeded up using the operation speedup ratios that have already been stored, thus allowing speedup of the operation without a repetition of the learning.

As described above, the robot system according to the first embodiment can learn the operation speedup ratios to speed up the operations by varying speed or acceleration relative to the performed operations.

[Second Embodiment]

Next, a robot system according to a second embodiment of the present invention will be described. The difference between the robot system according to the second embodiment of the present invention and the robot system according to the first embodiment is that the learning controller 23 changes the priority of operation of each of the plurality of areas in accordance with its learning state. The other configuration of the robot system according to the second embodiment is the same as that of the robot system according to the first embodiment, so the detailed description thereof will be omitted.

Figure 6:
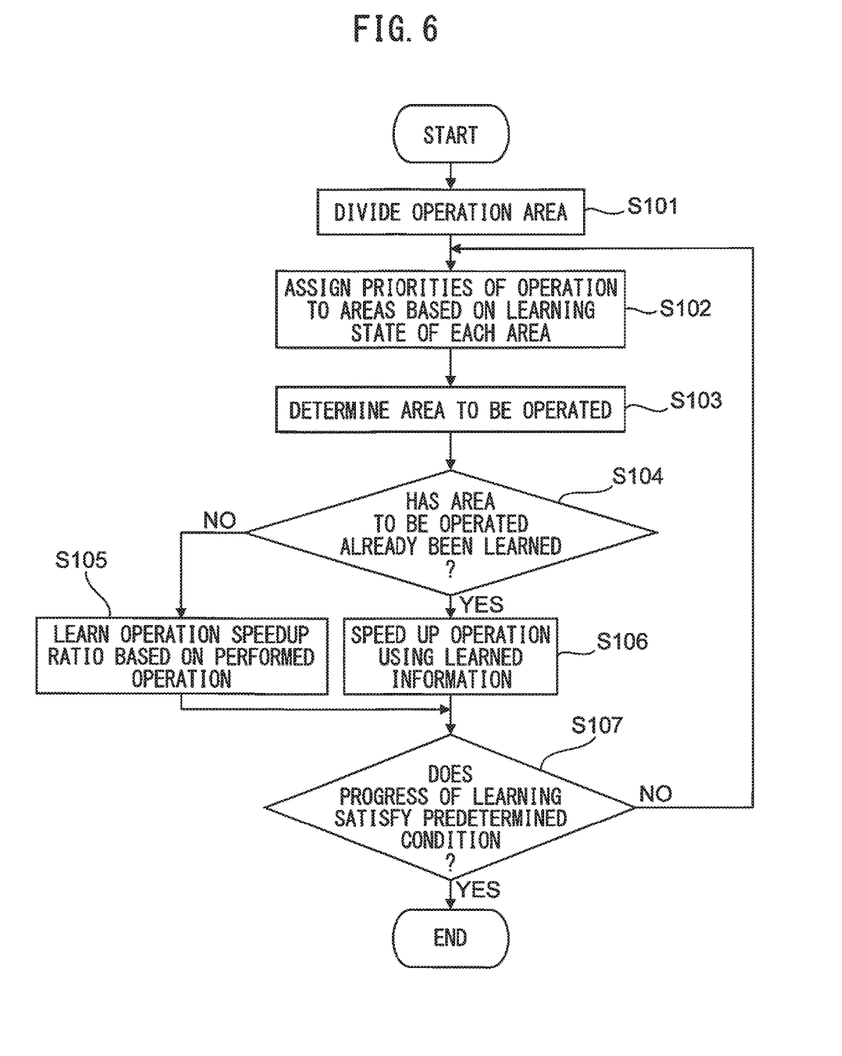
FIG. 6 is a flowchart showing the operation flow of a robot system according to a second embodiment of the present invention.

The operation flow of a learning method of the robot system according to the second embodiment will be described below with reference to a flowchart of FIG. 6. When learning is started, in step S101, the operation areas are divided into a plurality of areas by a predetermined resolution.

In step S102, priorities of operation are assigned to the areas in accordance with a learning state of each area. For example, in the system shown in FIG. 2, the operation areas are divided as shown in FIG. 5. In the operations of grasping a workpiece 12 in the "area B" and putting the workpiece 12 on the ejection conveyor 15, if the putting operation "from the area B to the area b" has already been learned, while the putting operation "from the area B to the area a" has not been learned, a priority is assigned to the putting operation "from the area B to the area a". Thus, the operations are efficiently performed in decreasing order of necessity for learning.

In step S103, before starting an actual operation, it is determined to which of the plurality of areas divided in step S101 an area to be operated corresponds. Then, in step S104, it is determined whether or not the area to be operated has already been learned, that is, whether operation to be performed in this area has not been learned or has already been learned. When the operation is determined to have not been learned, in step S105, the operation speedup ratio is learned based on the performed operation. On the other hand, when the operation is determined to have already been learned in step S104, the operation is speeded up based on the learned operation speedup ratio in step S106.

In step S107, the progress of learning is determined based on a ratio between not-learned operations and learned operations or the like. When a predetermined condition is satisfied, learning is completed. For example, the condition is determined such that learning is completed when 70% of all operations between the plurality of areas have already been learned. When the predetermined condition is not satisfied, the operation flow goes back to step S102 and learning is continued.

As described above, according to the robot system of the second embodiment, using the method of the present invention allows the robot to perform the operations with high efficiency in decreasing order of necessity for learning.

[Third Embodiment]

Next, a robot system according to a third embodiment of the present invention will be described. The difference between the robot system according to the third embodiment of the present invention and the robot system according to the first embodiment is that the learning controller 23 calculates the operation speedup ratio based on an allowable load of the motor for driving each axis of the robot 3 or 13 and a load of the motor during execution of an operation pattern, and the memory 24 stores the operation speedup ratio together with operation information including at least one of speed and acceleration before learning the operation. The other configuration of the robot system according to the third embodiment is the same as that of the robot system according to the first embodiment, so the detailed description thereof will be omitted.

Figure 7:
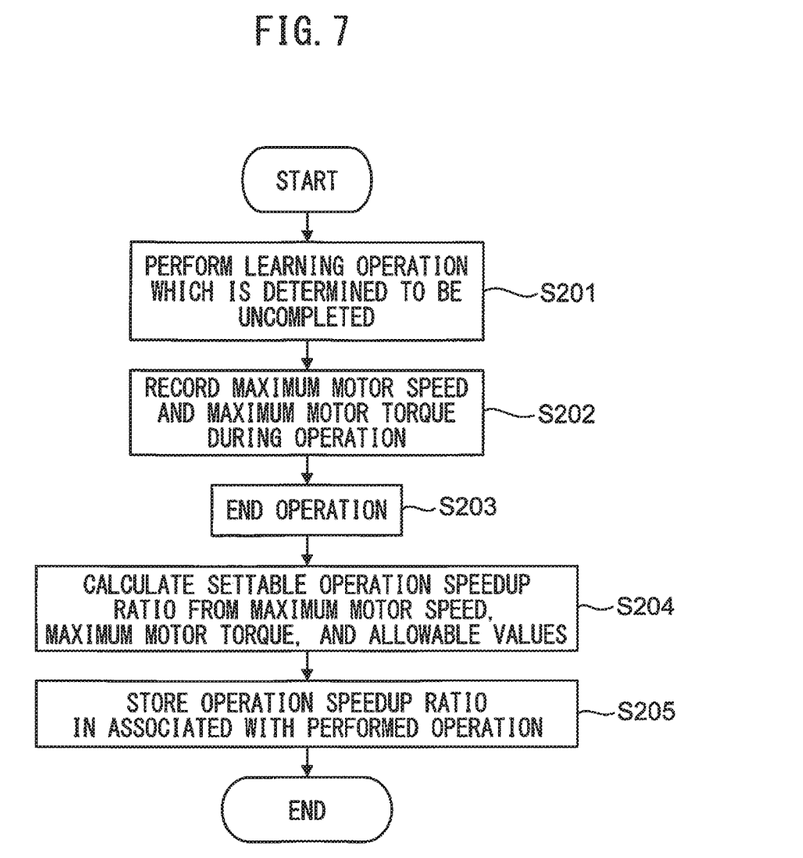
FIG. 7 is a flowchart showing the operation flow of a robot system according to a third embodiment of the present invention.

The operation flow of a learning method of the robot system according to the third embodiment will be described below with reference to a flowchart of FIG. 7. In step S201, a learning operation which is determined to be uncompleted is performed by the method described in the first embodiment.

In step S202, an allowable load (maximum motor speed and torque) of the motor for driving each axis of the robot 3 or 13, that is, a maximum motor speed $\omega\_max_j$ and a maximum motor torque $\tau\_max_j$ of each axis during the operation are recorded. Here, "j" indicates the number of each axis. In the case of the six-axis articulated robot, for example, j=1 to 6.

After the completion of the operation, a maximum value $\alpha_{max}$ of the operation speedup ratio $\alpha$ ($\alpha \geq 1.0$) that is settable to this operation pattern is calculated based on the stored maximum motor speed and maximum motor torque (step S204). Here, the relationship between elapsed time t required for the operation before speedup and a motor target angle θ is represented by the following equation (1):

$$\theta = f(t)(0 \leq t \leq t_{max}) \quad (1)$$

The operation speedup ratio α is an index for the operation to satisfy the following equation (2):

$$\theta = f(\alpha t)(0 \le t \le t_{max}/\alpha) \qquad (2)$$

Considering that a motor speed is proportional to α, and a motor torque is proportional to the square of α, in the above equation, the maximum value $\alpha_{max}$ of the allowable operation speedup ratio is calculated as follows.

$$\alpha_{max} = \min\left(\frac{\omega\_alw_j}{\omega\_max_j}, \sqrt{\frac{\tau\_alw_j}{\tau\_max_j}}\right)$$

Where, $\omega\_alw_j$ and $\tau\_alw_j$ represent an allowable load of the motor for each axis, that is, an allowable motor speed and an allowable motor torque, respectively.

In step S205, the operation speedup ratio calculated by the above equation is stored in associated with the performed operation pattern.

The learning method using the robot system according to the third embodiment of the present invention allows for speeding up the operation, while limiting a load on a robot mechanism within an allowable value.

[Fourth Embodiment]

Next, a robot system according to a fourth embodiment of the present invention will be described. The difference between the robot system according to the fourth embodiment of the present invention and the robot system according to the first embodiment is that the learning controller 23 calculates the operation speedup ratio based on difference information between a command value to the motor for driving each axis of the motor and a feedback value of the motor during execution of an operation pattern, and the memory 24 stores the operation speedup ratio together with operation information including at least one of speed and acceleration before learning the operation. The other configuration of the robot system according to the fourth embodiment is the same as that of the robot system according to the first embodiment, so the detailed description thereof will be omitted.

Figure 8:
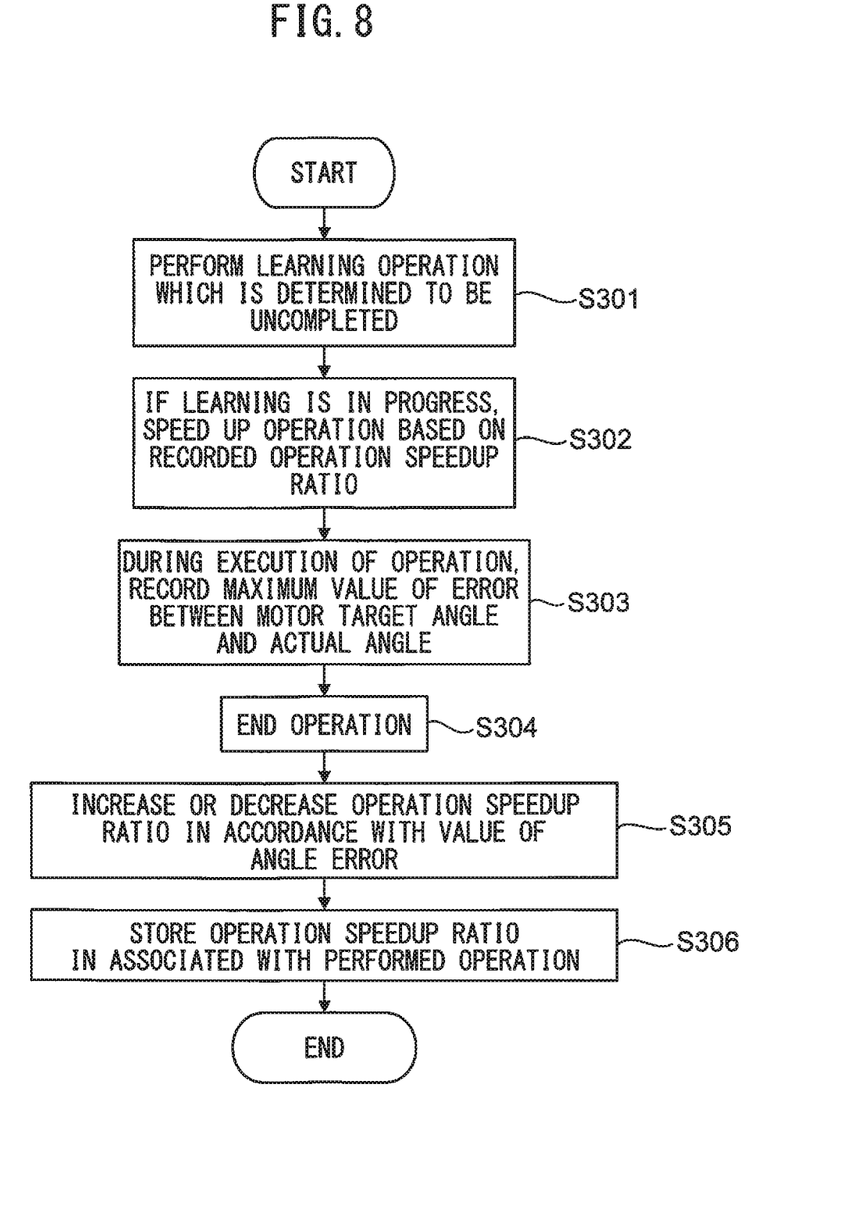
FIG. 8 is a flowchart showing the operation flow of a robot system according to a fourth embodiment of the present invention.

The operation flow of a learning method of the robot system according to the fourth embodiment of the present invention will be described with reference to a flowchart of FIG. 8.

First, in step S301, a learning operation which is determined to be uncompleted is performed by the method described in the first embodiment.

However, if the learning is in progress, in step S302, the operation is speeded up based on a recorded operation speedup ratio.

In step S303, a maximum value of an error between a motor target angle of each axis i.e. the command value and an actual angle i.e. the feedback value during execution of the operation is recorded.

In step S304, after completion of the operation, the operation speedup ratio is increased or decreased in accordance with the amount of the recorded angle error (step S305). As an example of step S305, when the maximum value of the angle error during the operation is less than $tol\_err1_j$, relative to allowable angle errors $tol\_err1_j$ and $tol\_err2_j$, ($tol\_err1_j \le tol\_err2_j$), the operation speedup ratio is increased by a predetermined amount. When the maximum value of the angle error during the operation is equal to or more than $tol\_err2_j$, the operation speedup ratio is decreased by a predetermined amount.

In step S306, the operation speedup ratio calculated as above is stored in associated with information about the operation pattern, that is, operation information including at least one of speed and acceleration before learning the operation.

According to the learning method using the robot system of the fourth embodiment of the present invention, the operation speedup ratio is determined so as to limit the error between the motor target angle and the actual angle of each axis during the operation, thus allowing for speeding up the operation, while limiting a motor vibration within an allowable value.

[Fifth Embodiment]

Next, a robot system according to a fifth embodiment of the present invention will be described. The difference between the robot system according to the fifth embodiment of the present invention and the robot system according to the first embodiment is that the learning controller 23 retrieves a learned operation that is similar to an operation to be performed from past learned data, before execution of the operation. When the similar learned operation is present, an operation speedup ratio is corrected based on an operation speedup ratio associated with the learned similar operation and a difference between information on the operation before execution and information on the learned operation. The controller 25 speeds up the operation using the corrected operation speedup ratio. The other configuration of the robot system according to the fifth embodiment is the same as that of the robot system according to the first embodiment, so the detailed description thereof will be omitted.

Figure 9:
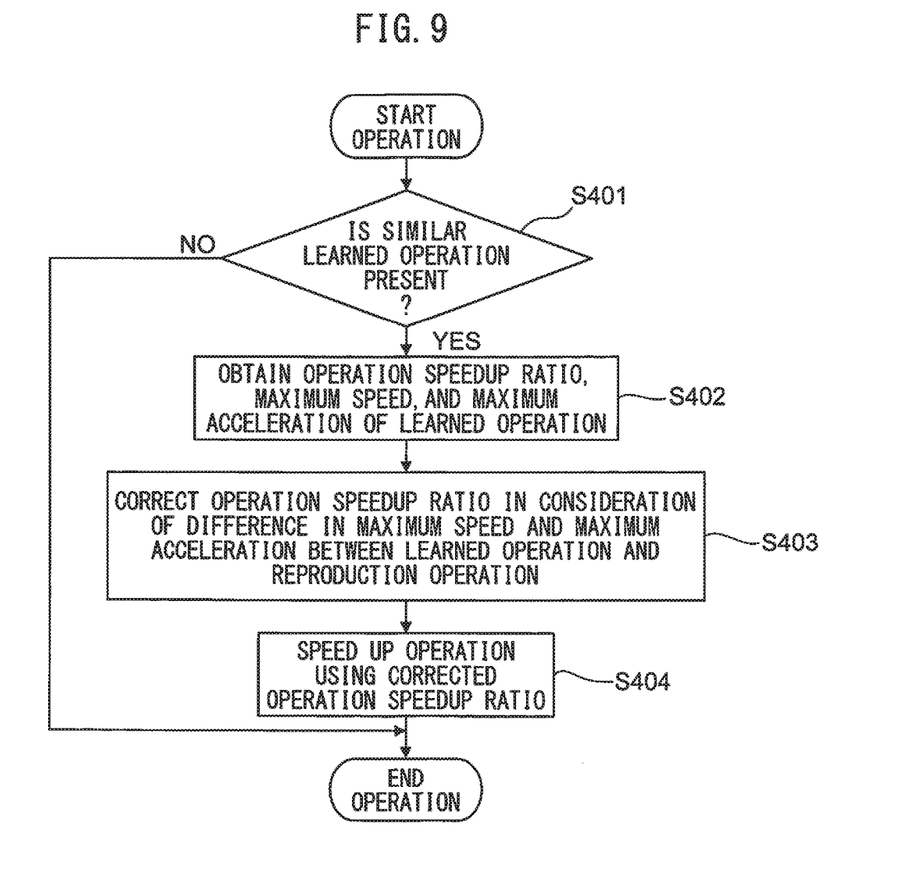
FIG. 9 is a flowchart showing the operation flow of a robot system according to a fifth embodiment of the present invention.

The operation flow of the robot system according to the fifth embodiment of the present invention will be described with reference to a flowchart of FIG. 9.

In learning by the robot system according to the fifth embodiment of the present invention, a maximum speed "v" and a maximum acceleration "a" before speedup are stored together with an operation speedup ratio α. The maximum speed "v" and a maximum acceleration "a" are values that are calculated at the time of planning an operation and known before actual execution of the operation.

After the learning, before execution of the operation (hereinafter referred to as "reproduction operation"), in step S401, it is retrieved whether or not an operation similar to the reproduction operation has already been learned from past learned data. The operation (hereinafter referred to as "learned operation") similar to the reproduction operation refers to an operation the workpiece areas of which are the same or in the vicinity of those of the reproduction operation.

When the learned operation is present, in step S402, the operation speedup ratio $\alpha_{max}$ and the maximum speed "v" and maximum acceleration "a" before speedup that are associated with the learned operation are obtained.

The maximum speed and maximum acceleration before speedup are not always the same between the learned operation and the reproduction operation. Thus, due to this difference, when the reproduction operation is speeded up using the operation speedup ratio $\alpha_{max}$, a motor speed, a motor torque, an angle error, and the like may significantly exceed their allowable values. To prevent this effect, in step S403, the operation speedup ratio $\alpha_{max}$ of the learned operation is corrected to an operation speedup ratio $\alpha'_{max}$ for the reproduction operation in consideration of the difference in the maximum speed and maximum acceleration before speedup between the learned operation and the reproduction operation.

When V and A represent the maximum speed and maximum acceleration of the reproduction operation before speedup, respectively, $\alpha'_{max}$ is calculated as follows.

$$\alpha'_{max} = \min\left(a_{max} \times \frac{v}{V}, a_{max} \times \sqrt{\frac{a}{A}}\right)$$

Based on the above equation, the operation speedup ratio is corrected so as to bring the maximum speed and maximum acceleration of the reproduction operation during speedup close to the speed and acceleration of the learned operation during speedup.

Then, in step S404, the operation is speeded up using the corrected operation speedup ratio $\alpha'_{max}$.

As described above, according to the robot system of the fifth embodiment, even if an operation has not been operated yet, the operation can be speeded up based on information about learning of another similar operation.

Using the robot systems according to the embodiments of the present invention allows the robot to learn the operations with high efficiency in decreasing order of frequency of actual use.

What is claimed is:

1. A robot system, comprising:
a detector for detecting the position and posture of a workpiece to be operated present in a predetermined operation area;
a robot for performing a predetermined operation on the workpiece based on information about the detected position and posture; and
a robot control device for controlling the robot,
wherein the robot control device includes:
an area divider for dividing the operation area into a plurality of areas of a predetermined size;
an area determiner for determining in which area of the plurality of areas the workpiece is present;
a learning controller for learning an operation speedup ratio to speed up the operation by varying speed or acceleration on an area-by-area basis for the plurality of areas;
a memory for storing the position and the operation speedup ratio of the area, among the plurality of areas, in which the workpiece is present; and
a controller for determining whether or not the operation has already been learned in an area, among the plurality of areas, in which a new workpiece is present, and when the operation has already been learned, the controller controls the robot to perform the operation on the new workpiece using the learned operation speedup ratio, and when the operation has not been learned, the controller makes the learning controller learn the operation speedup ratio, and
wherein the learning controller changes a priority of operation of each of the plurality of areas in accordance with a state of learning.

2. The robot system according to claim 1, wherein the operation includes a grasping operation by which the robot grasps the workpiece disposed in the operation area and a putting operation in which the robot puts the grasped workpiece in a workpiece completion area.

3. The robot system according to claim 1, wherein
the learning controller calculates the operation speedup ratio based on an allowable load of a motor for driving each axis of the robot and a load of the motor during execution of an operation pattern, and
the memory stores the operation speedup ratio together with operation information,
the operation information including at least one of the speed and the acceleration before learning the operation.

4. The robot system according to claim 3, wherein
before execution of the operation, the learning controller retrieves a learned operation that is similar to the operation,
when the learned operation is present, the operation speedup ratio is corrected by the learning controller based on
an operation speedup ratio associated with the learned operation, and
a difference between information on the operation before execution and information on the learned operation, and
the controller speeds up the operation using the corrected operation speedup ratio.

5. The robot system according to claim 1, wherein
the learning controller calculates the operation speedup ratio based on difference information between a command value to a motor for driving each axis of the robot and a feedback value from the motor during execution of an operation pattern, and
the memory stores the operation speedup ratio together with operation information,
the operation information including at least one of the speed and the acceleration before learning the operation.

* * * * *